United States Patent
Linnebjerg et al.

(10) Patent No.: US 11,766,631 B2
(45) Date of Patent: Sep. 26, 2023

(54) INTERNAL CONTINUOUS AIR BYPASS

(71) Applicant: C. C. Jensen A/S, Svendborg (DK)

(72) Inventors: Mads Linnebjerg, Svendborg (DK); Anders Damsgaard Serup, Skanderborg (DK); Ruben Hensen, Svendborg (DK)

(73) Assignee: C.C. Jensen A/S

( * ) Notice: Subject to any disclaimer, the term of this patent is extended or adjusted under 35 U.S.C. 154(b) by 215 days.

(21) Appl. No.: 16/648,702

(22) PCT Filed: Sep. 14, 2018

(86) PCT No.: PCT/DK2018/050227
§ 371 (c)(1),
(2) Date: Mar. 19, 2020

(87) PCT Pub. No.: WO2019/057255
PCT Pub. Date: Mar. 28, 2019

(65) Prior Publication Data
US 2020/0269169 A1    Aug. 27, 2020

(30) Foreign Application Priority Data
Sep. 19, 2017   (DK) .......................... PA 2017 70701

(51) Int. Cl.
*B01D 36/00* (2006.01)
*B01D 29/15* (2006.01)

(52) U.S. Cl.
CPC .......... *B01D 36/001* (2013.01); *B01D 29/15* (2013.01); *B01D 2201/182* (2013.01)

(58) Field of Classification Search
CPC ...... B01D 36/001; B01D 36/00; B01D 29/15; B01D 29/33; B01D 29/46; B01D 29/00; B01D 2201/182; B01D 35/147
USPC .................................................. 210/497.01
See application file for complete search history.

(56) References Cited

U.S. PATENT DOCUMENTS

| | | |
|---|---|---|
| 9,108,128 B2 | 8/2015 | Schmitz et al. |
| 2001/0035376 A1 | 11/2001 | Dworatzek |
| 2007/0251875 A1 | 11/2007 | Koch et al. |
| 2013/0270162 A1 | 10/2013 | Ardes |
| 2015/0238883 A1* | 8/2015 | Jokschas .............. B01D 35/005 210/497.01 |

(Continued)

FOREIGN PATENT DOCUMENTS

WO    2014082762 A1    6/2014

*Primary Examiner* — Akash K Varma
(74) *Attorney, Agent, or Firm* — Luedeka Neely Group, PC

(57) ABSTRACT

An oil filtration unit having an inlet adapted to receive contaminated oil from the surroundings and to release the contaminated oil to an inner opening of the unit, and an outlet adapted to release filtered oil to the surroundings. The inner opening has therein an oil filter for filtering the contaminated oil. The oil filter has a filter inlet defined by an outer surface of the oil filter, an inner filter volume adapted to receive filtered oil, and a filter that provides fluid/liquid communication between the inner filter volume and the outlet of the unit in order to release filtered oil from the inner filter volume. The oil filter has a top and a bottom end surface, where the top end surface of the oil filter has an aperture for providing fluid/liquid communication between the inner opening of the unit and the inner filter volume.

13 Claims, 2 Drawing Sheets

(56) References Cited

U.S. PATENT DOCUMENTS

Figure 1:
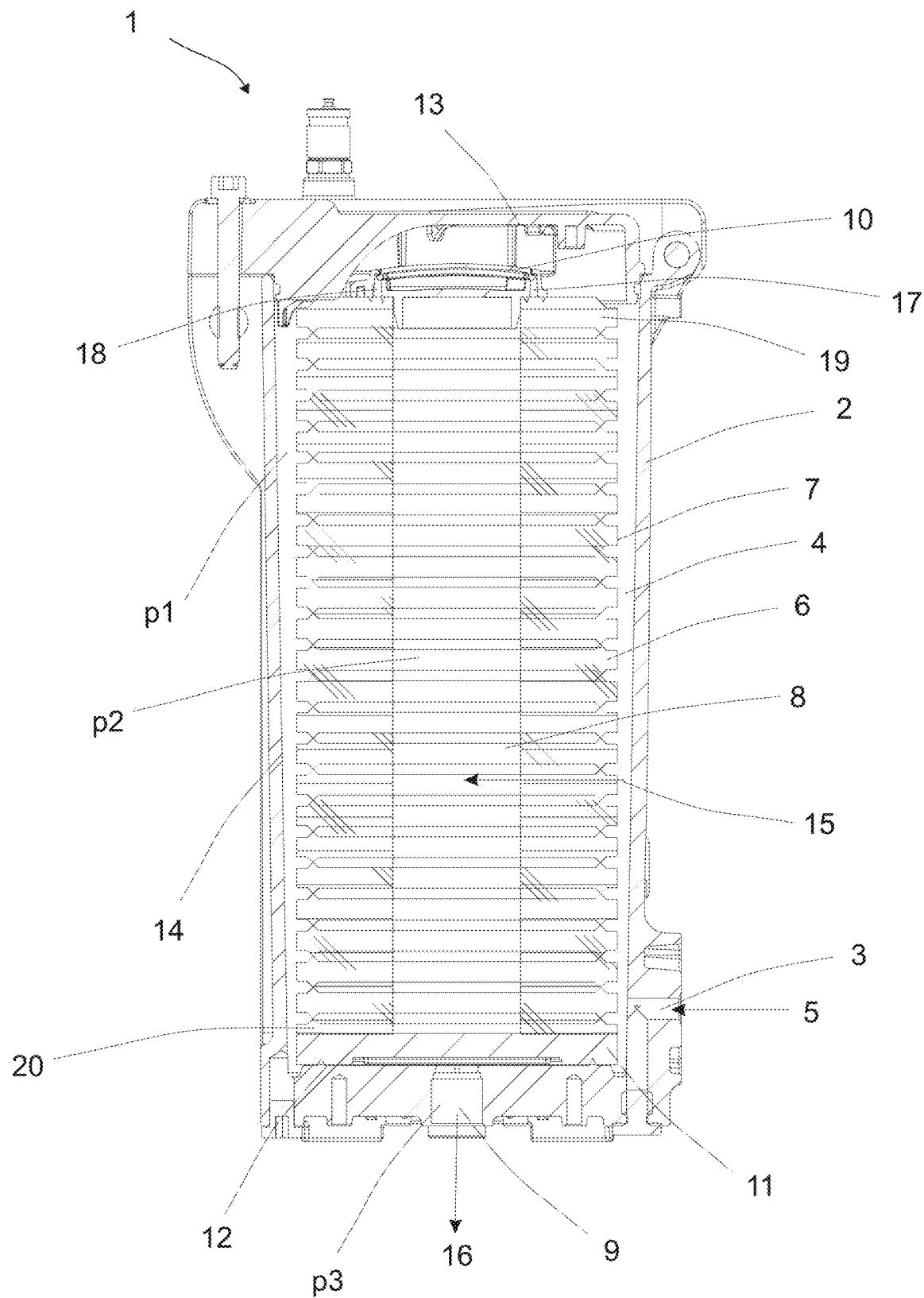

| | | |
|---|---|---|
| 2016/0271539 A1 | 9/2016 | Jainek |
| 2016/0332101 A1* | 11/2016 | Booker ................ B01D 35/147 |
| 2018/0264383 A1* | 9/2018 | Bisurkar .............. B01D 29/606 |
| 2019/0022562 A1 | 1/2019 | Jensen et al. |

* cited by examiner

INTERNAL CONTINUOUS AIR BYPASS

The present invention relates to an oil filtration unit comprising:
- a housing, which comprises a housing inlet adapted to receive contaminated oil from the surroundings and to release the contaminated oil to an inner opening of the housing, and a housing outlet adapted to release filtered oil to the surroundings, where the inner opening of the housing is defined by an inner bottom surface, an inner top surface, and at least one inner side surface,
- an oil filter for filtering the contaminated oil, said oil filter being arranged inside the inner opening of the housing, where said oil filter comprises a filter inlet defined by an outer surface of the oil filter, an inner filter volume adapted to receive filtered oil, and a filter outlet inside said housing providing fluid/liquid communication between the inner filter volume and the housing outlet in order to release the filtered oil from the inner filter volume, and where said oil filter further comprises a top and a bottom end surface relative to the longitudinal axis of the oil filter.

The present invention further relates to an oil filter for being used in an oil filtration unit.

Air and/or solid contaminants may be present in e.g. hydraulic oil used in various types of machinery or in lubrication oil used in e.g. gears and bearings. As an example, air may be incorporated into the oil used in the gearbox system of a wind turbine, when the wind turbine is operating. Air may also be incorporated into oil, in e.g. a suction line, due to an unintended leakage in the line which may have arisen as a result of lack of maintenance of the line, vibrations, or a defect in the mounting of the line. Thus, air is also present in the contaminated oil being filtered in an oil filtration unit. Inside said housing, non-dissolved air moves to the vertically upper part of said housing forming an unwanted collection (accumulation) of air which may impair the functioning of the filter and the filtration process.

Known ways of removing such a collection of air in oil filtration units comprise various venting devices releasing the accumulated air to the surroundings with the risk of unwanted oil spillage or a pipe leading the air from the vertically upper part of the housing to a point downstream of the oil filtration unit thereby by-passing the oil filter.

However, by removing such a collection of air in the above-mentioned way, not only air, but also an amount of oil is bypassing the oil filter, and the bypassing oil is not being filtered. Further, by providing a pipe to bypass the oil filter, the customer's ability to handle the upper part of the housing (such as the hood of the housing) is limited and also introduces an extra cost to the product of the oil filtration unit as well as extra components that may fail leading to oil spillage or incomplete filtering of the contaminated oil.

Thus, there is a need for a simpler way of removing air present in an oil filtration unit, a way which also gives the possibility of filtering all of the contaminated oil.

In accordance with the invention, there is provided an oil filtration unit comprising:
- a housing, which comprises a housing inlet adapted to receive contaminated oil from the surroundings and to release the contaminated oil to an inner opening of the housing, and a housing outlet adapted to release filtered oil to the surroundings, where the inner opening of the housing is defined by an inner bottom surface, an inner top surface, and at least one inner side surface,
- an oil filter for filtering the contaminated oil, said oil filter being arranged inside the inner opening of the housing, where said oil filter comprises a filter inlet defined by an outer surface of the oil filter, an inner filter volume adapted to receive filtered oil, and a filter outlet inside said housing providing fluid/liquid communication between the inner filter volume and the housing outlet in order to release the filtered oil from the inner filter volume, and where said oil filter further comprises a top and a bottom end surface relative to the longitudinal axis of the oil filter,
- where the top end surface of the oil filter comprises at least one aperture providing fluid/liquid communication between the inner opening of the housing and the inner filter volume.

Within the present invention, the features top and bottom end surfaces are to be understood as elements which are attached to the ends of an oil filter relative to the longitudinal axis of said oil filter. The top and bottom end surfaces (also known as functional pads) also have the purpose of connecting and stabilising the oil filter to mounts in the housing of an oil filtration unit. Thus, the top end surface is attached to the vertically uppermost end of the oil filter, and the bottom end surface is attached to the vertically lowermost end of the oil filter, when the oil filter is installed in the housing of the oil filtration unit.

By providing an oil filtration unit, where the oil filter comprises a top end surface with at least one aperture, air present in the inner opening of the housing may be removed via said at least one aperture. Thus, said at least one aperture may be used for letting air and a minor amount of oil (the major part of the oil is moving via the filter inlet through the filtering material of the oil filter) bypass the filter inlet internally in the housing, for which reason there is no need for providing e.g. an external pipe for bypassing the oil filter. This results in a simplification of the design of the housing and therefore makes it easier for the user to operate the oil filtration unit, and furthermore lowers the costs of producing the unit as fewer elements are to be used and as the aperture is provided in an element (i.e. the top end surface) already being part of the oil filter.

As the aperture leads the air (and minor part of oil) through at least part of the oil filter, said minor part of oil will also be filtered which will result in an overall better filtration of the contaminated oil as there will be no bypassing of the oil filter (through e.g. an external pipe).

In an embodiment, the top end surface of the oil filter can comprise two apertures providing fluid/liquid communication between the inner opening of the housing and the inner filter volume. By providing two apertures, a reliable continuous removal of air from the inner opening of the housing, and a filtering of the oil (minor part) bypassing the filter inlet via said apertures, are provided.

In an embodiment, said top end surface can further comprise a structure, and where a first open end of said structure can be connected to said at least one aperture, and a second open end of said structure can extend away from said top end surface.

Fluid/liquid communication is provided between said first and second open end of said structure. By providing a structure with open ends, where a first open end of said structure may be connected to said at least one aperture and a second open end may extend away from the top end surface, the user has the possibility of arranging the second open end of said structure at the most suited location in the housing. The location may be where the air is most likely located (i.e. the vertically uppermost part of the housing) to ensure that the maximum amount of air and minimum amount of oil is bypassing the filter inlet by flowing through said at least one aperture. The structure may be a tube.

In an embodiment, the at least one aperture or second open end of said structure can be located adjacent to the inner top surface of the housing, when the oil filter is arranged inside the inner opening of the housing.

By arranging the at least one aperture or second open end of said structure adjacent to the inner top surface of the housing, it is ensured that said aperture or second open end is arranged at the vertically highest location within the inner opening of the housing. Thereby, the maximum amount of air and minimum amount of oil is bypassing the filter inlet by flowing through said aperture.

In an embodiment, the at least one aperture or second open end of said structure can be located 3 mm to 30 mm from the inner top surface of the housing, when the oil filter is arranged inside the inner opening of the housing.

The inventors have found that the at least one aperture or second open end of said structure may advantageously be located 3 mm to 30 mm from the inner top surface of the housing, such as 3 mm, 5 mm, 10 mm, 15 mm, 20 or 30 mm as thereby, the aperture or second open end of said structure is located at the vertically uppermost part of the inner opening of the housing to ensure that the maximum amount of air and minimum amount of oil is bypassing the filter inlet via said aperture. At the same time, it is ensured that said aperture or second open end is not too close to said inner top surface to prevent e.g. that said aperture or second open end becomes blocked due to impurities or will conflict mechanically with the inner top end of the housing.

In an embodiment, filtering material of the oil filter can be arranged between said at least one aperture and said inner filter volume.

The filtering material of the oil filter, which may be any natural or synthetic polymer, such as cellulose, may be provided between the at least one aperture and said inner filter volume so that the air and oil that enter the aperture have to pass/flow through the filtering material before entering said inner filter volume. Thereby, it is ensured that all of the air and oil entering said aperture and inner filter volume (and bypassing the filter inlet) is also filtered which provides an even more clean oil exiting the oil filtration unit as no contaminated oil is allowed to bypass said filtering material.

Said filtering material may be arranged at said aperture, such as at the inlet or outlet of said aperture. Said filtering material may be provided as a disc/plate or block of filtering material (having the same porosity of the filtering material) provided at the top end surface of the oil filter, such as being the vertically highest disc of the oil filter, to which oil filter the top end surface is connected. In case the oil filter is provided as a cylindrically shaped cellulose filter being produced of multiple circular discs of filtering material, the disc arranged at the end to which the top end surface is connected may be a homogeneous disc (being porous), so that the bypassing air and oil have to pass through this disc to enter the inner filter volume.

The cross-sectional area of the at least one aperture should be of a size to ensure effective removal of air from the inner opening of the housing, but at the same time limit the amount of oil that bypasses the filter inlet via said aperture. Having a too small cross-sectional area of the at least one aperture gives the risk of said aperture being blocked by impurities, and having a too large cross-sectional area gives the risk of a too large amount of oil bypassing the filter inlet. By providing that filtering material of the oil filter is arranged between said aperture and said inner filter volume, the contaminated oil that bypasses the filter inlet is also filtered. This means that the cross-sectional area of the at least one aperture may be relatively large, as the bypassing oil is filtered in any case. Further, this means that the oil filter may function both when the oil filter is new (small pressure difference between first pressure, $p1$, in the inner opening of the housing, and the second pressure, $p2$, in the inner filter volume) and when the oil filter is contaminated with particles (large pressure difference), and means that the oil filter is independent of the viscosity of the oil.

In an embodiment, the cross sectional area of the at least one aperture or second open end of said structure can be 1 $mm^2$ to 10 $mm^2$, which the inventors have found to provide optimal removal of air from the inner opening of the housing and optimal filtration of the oil bypassing the filter inlet.

In an embodiment, filtering material of the oil filter can be arranged between said inner filter volume and said filter outlet.

The filtering material of the oil filter, which may be any natural or synthetic polymer, such as cellulose, may be provided between said inner filter volume and said filter outlet so that the air and oil that enter the aperture and therefore the inner filter volume have to pass/flow through the filtering material before passing said filter outlet and exiting the oil filter. Thereby, it is ensured that all of the air and oil passing said filter outlet (and which have bypassed the filter inlet) are filtered which provides an even more clean oil exiting the oil filtration unit as no contaminated oil is allowed to bypass the filtering material.

Said filtering material may be arranged at the filter outlet of the oil filter, such as blocking the filter outlet. Said filtering material may also be provided as a disc/plate or block of filtering material (i.e. without openings, but having the same porosity as the filtering material) provided at the bottom end surface of the oil filter, such as being the vertically lowermost disc of the oil filter, to which oil filter the bottom end surface is connected. In case the oil filter is provided as a cylindrically shaped cellulose filter being produced of multiple circular discs of filtering material, the disc arranged at the end to which the bottom end surface is connected may be a homogeneous disc without openings (but being porous), so that the bypassing air and oil have to pass through this disc to exit the oil filter.

In an embodiment, filtering material of the oil filter can be arranged both between said at least one aperture and said inner filter volume, and between said inner filter volume and said filter outlet.

Thereby, an increased filtration of the oil flowing through said aperture of the top end surface is obtained.

In accordance with the invention, there is further provided an oil filter for filtering contaminated oil in an oil filtration unit according to above, said oil filter being adapted to be arranged inside an inner opening of a housing of said oil filtration unit, where said oil filter comprises a filter inlet defined by an outer surface of the oil filter, an inner filter volume adapted to receive filtered oil, and a filter outlet providing fluid/liquid communication between the inner filter volume and a housing outlet in order to release the filtered oil from the inner filter volume, and where said oil filter further comprises a top and a bottom end surface relative to the longitudinal axis of the oil filter, where the top end surface of the oil filter comprises at least one aperture providing fluid/liquid communication between the inner opening of the housing and the inner filter volume.

The structure and function of the oil filtration unit and of the oil filter will be described in more detail below with references to an exemplary embodiment shown in the drawing wherein, FIG. 1 shows an embodiment of an oil filtration unit comprising an oil filter seen from the side in a cross-sectional view.

Figure 2:
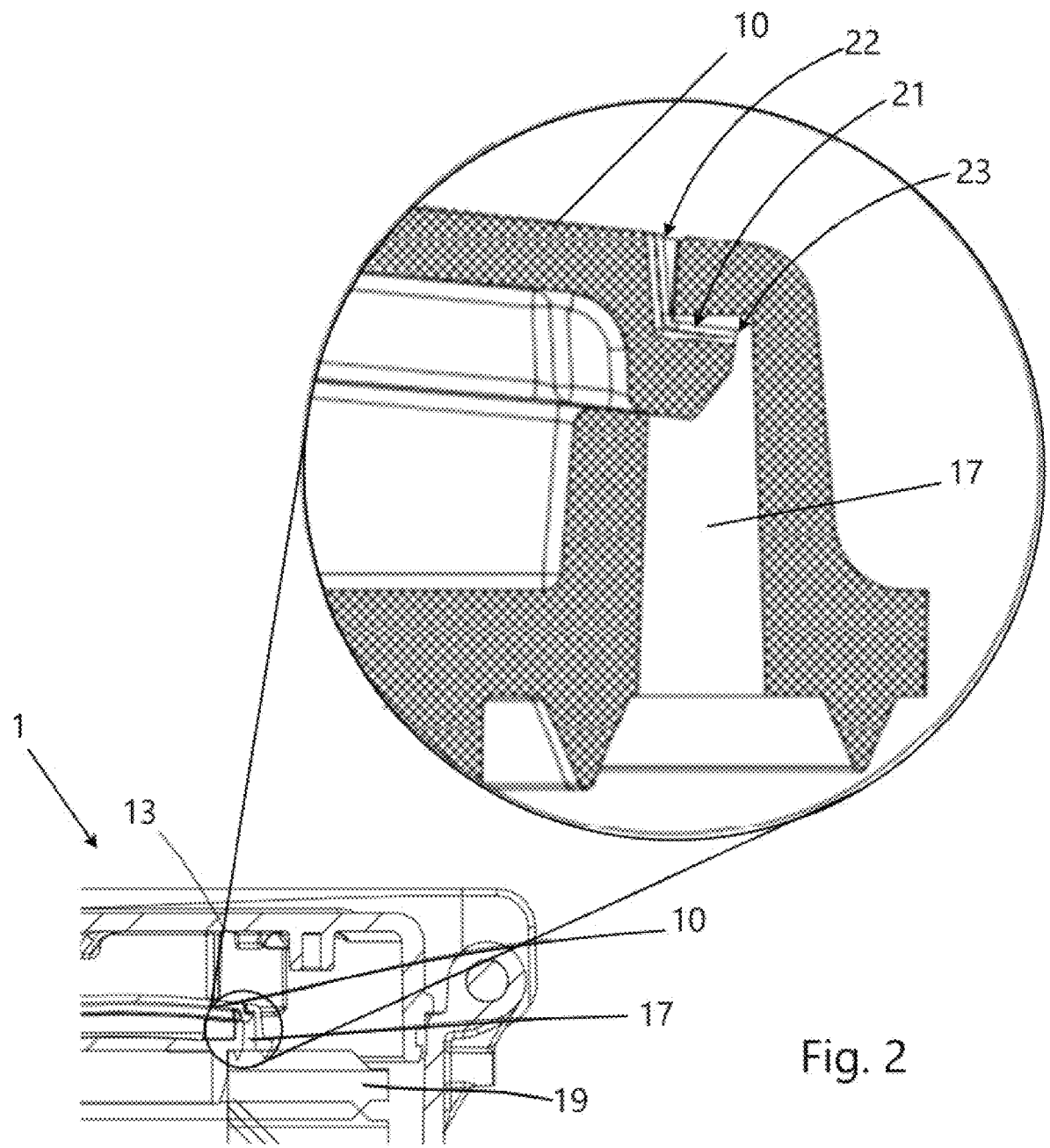

FIG. 2 shows an enlarged view of a portion of the oil filtration unit of FIG. 1.

The oil filtration unit 1 may comprise a housing 2 which comprises a housing inlet 3 adapted to receive contaminated oil from the surroundings and feed the oil at a first pressure p1 to an inner opening 4 of the housing 2 of the oil filtration unit 1 as illustrated by the arrow 5.

The oil filtration unit 1 may comprise an oil filter 6 for filtering the contaminated oil, the oil filter 6 being arranged in the inner opening 4 of the housing 2. The oil filter 6 may comprise an outer surface 7 defining a filter inlet and may comprise an inner filter volume 8 extending along a longitudinal axis of the oil filter 6 and adapted to receive filtered oil at a second pressure p2. Furthermore, the oil filter 6 may comprise a filter outlet inside the housing 2 providing fluid/liquid communication between the inner filter volume 8 and a housing outlet 9 of the oil filter 6, and the filter outlet may thus be adapted to release the filtered oil from the inner filter volume 8. A top 10 and a bottom end plate 11 may be arranged/mounted and sealed to at the ends 19,20 of the oil filter 6 relative to a longitudinal axis of the oil filter 6. Said top 10 and bottom end plate 11 may at least partly be made of a solid material, such as a metal or plastic material, which provides stability, or may at least partly be made of the same filtering material as the oil filter 6 such that said top 10 and/or bottom end plate 11 may contribute to the filtering of the contaminated oil.

The inner opening 4 of the housing 2 is defined by an inner bottom surface 12, an inner top surface 13, and at least one inner side surface 14. A sealing (not shown) may be arranged between the bottom end plate 11 of the oil filter 6 and the inner bottom surface 12 of the housing 2 so that sealing is provided between the housing 2 and the oil filter 6 resulting in that the oil to be filtered is prevented from flowing directly from the housing inlet 3 to the housing outlet 9 and thus from bypassing the oil filter 6.

Instead, contaminated oil, which has been introduced into the inner opening 4 of the housing 2 and been exposed to the outer surface 7, i.e. filter inlet, of the oil filter 6, may flow through the filtering material of the oil filter 6. During passage of the oil filter 6, as indicated by the arrows 15, the contaminated oil may be divided into solid contaminants retained by the oil filter 6 and filtered oil released into the inner filter volume 8 at a second pressure p2 which may be lower than the first pressure p1 due to the flow resistance through the oil filter 6.

The filtered oil may be released from the inner filter volume 8 to the surroundings via firstly the bottom end plate 11 and secondly via the housing outlet 9 of the oil filtration unit 1 as illustrated by the arrow 16.

It is foreseen that the filter outlet may possibly comprise a hydraulic resistance providing a fluid/liquid flow restriction between the inner filter volume 8 and the housing outlet 9 in order to increase the second pressure p2 inside the inner filter volume 8. The hydraulic resistance would result in that the filtered oil would be released from the inner filter volume 8 at a third pressure p3 being lower than the second pressure p2. As a consequence of a hydraulic resistance at the filter outlet, the second pressure p2 in the inner filter volume 8 would be larger than would be the case if no hydraulic resistance was present at the filter outlet. Thus, a back pressure is provided which ensures that air in the oil remains dissolved and does not affect the filtration efficiency.

The top end plate 10 further comprises at least one aperture, and as shown in FIG. 1 may comprise two apertures 17,18 providing fluid/liquid communication between the inner opening 4 of the housing 2 and the inner filter volume 8.

In an embodiment, a structure (such as a tube 21) which may comprise a first open end 23 may be connected to the apertures 17,18 and a second open end 22 may extend away from the top end plate 10.

The apertures 17,18 (or the second open end of said structure) may be located adjacent to the inner top surface 13 of the housing 2, when the oil filter 6 is arranged inside the inner opening 4 of the housing 2. Said apertures 17,18 may be located 3 mm to 30 mm from the inner top surface 13 of the housing 2, when the oil filter 6 is arranged inside the inner opening 4 of the housing 2.

After start-up of the oil filtration unit (and of the pump leading contaminated oil to the oil filtration unit), contaminated oil is introduced into the inner opening 4 of the housing 2 at a first pressure, p1, and the oil filter 6 is experiencing stress as p1 on the outer surface 7 of the oil filter 6 is higher than the second pressure, p2, in the inner filter volume 8. Due to this pressure difference, the oil level then slowly increases in the housing 2 until the level eventually reaches the edge of the apertures 17,18 (or of the second (open) end of the structure) and enters said apertures 17,18 to be introduced into the inner filter volume 8. During the rising of the level of oil, air present in inner opening 4 of the housing 2 is also being sucked out through the apertures 17,18.

In case the oil filter 6 is of a type comprising a hydraulic resistance at the filter outlet, the air introduced into the inner filter volume 8 could potentially be trapped in said inner filter volume 8. However, as the second pressure p2 inside the inner filter volume 8 is higher than the third pressure p3 after the filter outlet, the air and oil will be forced through the hydraulic resistance and out to the housing outlet 9 and further to the surroundings.

The filtering material of the oil filter, which may be any natural or synthetic polymer, such as cellulose, is provided between the apertures 17,18 and said inner filter volume 8 so that the air and oil that enter the apertures 17,18 have to pass/flow through the filtering material before entering said inner filter volume 8. Thereby, it is ensured that all of the air and oil entering said apertures 17,18 and inner filter volume 8 (and bypassing the filter inlet) are also filtered which provides an even more clean oil exiting the oil filtration unit 1 as no contaminated oil is allowed to bypass said filtering material.

Said filtering material may be arranged at said apertures 17,18, such as at the inlet or outlet of said apertures 17,18. Said filtering material may also be provided as a disc/plate or block of filtering material (i.e. without openings, but having the porosity of the filtering material) provided at the top end surface 10 of the oil filter 6. In case the oil filter is provided as a cylindrically shaped cellulose filter being produced of multiple circular discs of filtering material, the disc arranged at the end to which the top end surface 10 is connected may be a homogeneous disc without openings (but with a porosity), so that the bypassing air and oil has to pass through this disc to enter the inner filter volume 8.

The filtering material of the oil filter 6 may be provided between said inner filter volume 8 and said filter outlet so that the air and oil that enter the apertures 17,18 and therefore the inner filter volume 8 have to pass/flow through the filtering material before entering said filter outlet and exiting the oil filter 6. Thereby, it is ensured that all of the air and oil entering said filter outlet (and which have bypassed the filter inlet) are filtered which provides an even more clean oil exiting the oil filtration unit 1 as no contaminated oil is allowed to bypass the filtering material.

Said filtering material may be arranged at the filter outlet of the oil filter 6, such as blocking the filter outlet. Said filtering material may also be provided as a disc/plate or block of filtering material (i.e. without openings, but having the porosity of the filtering material) provided at the bottom end surface 11 of the oil filter 6. In case the oil filter 6 is provided as a cylindrically shaped cellulose filter being produced of multiple circular discs of filtering material, the disc arranged at the end to which the bottom end surface 11 is connected may be a homogeneous disc without openings (but with a porosity), so that the bypassing air and oil has to pass through this disc to exit the oil filter 6.

The invention claimed is:

1. Oil filtration unit comprising:
    a housing, which comprises a housing inlet adapted to receive contaminated oil and to release the contaminated oil to an inner opening of the housing, and a housing outlet adapted to release filtered oil, where the inner opening of the housing is defined by an inner bottom surface, an inner top surface, and at least one inner side surface,
    an oil filter for filtering the contaminated oil, said oil filter being arranged inside the inner opening of the housing, where said oil filter comprises a filter inlet defined by an outer surface of the oil filter, an inner filter volume adapted to receive the filtered oil, and a filter outlet inside said housing providing fluid communication between the inner filter volume and the housing outlet in order to release the filtered oil from the inner filter volume, and where said oil filter further has a top end surface and a bottom end surface attached at opposing ends of said oil filter relative to a longitudinal axis of the oil filter,
    characterized in that
    the top end surface of the oil filter comprises at least one aperture configured to provide continuous gas and/or liquid communication between the inner opening of the housing and the inner filter volume, wherein said at least one aperture extends in an axial direction relative to the longitudinal axis of the oil filter and has a cross-sectional area of 1-10 $mm^2$, and wherein filtering material of the oil filter is arranged between said at least one aperture and said inner filter volume,
    said top end surface further comprises a tube, and where a first open end of said tube is connected to said at least one aperture, and a second open end of said tube extends away from said top end surface,
    where the second open end of said tube is located adjacent to the inner top surface of the housing, when the oil filter is arranged inside the inner opening of the housing.

2. The oil filtration unit according to claim 1, where the top end surface of the oil filter comprises two apertures providing gas and/or liquid communication between the inner opening of the housing and the inner filter volume.

3. The oil filtration unit according to claim 1, where the at least one aperture or the second open end of said tube is located 3 mm to 30 mm from the inner top surface of the housing, when the oil filter is arranged inside the inner opening of the housing.

4. The oil filtration unit according to claim 1, where a cross sectional area of the second open end of said tube ranges from 1 $mm^2$ to 10 $mm^2$.

5. The oil filtration unit according to claim 1, where the filtering material of the oil filter is also arranged between said inner filter volume and said filter outlet.

6. An oil filter with a top end surface and a bottom end surface attached at opposing ends of said oil filter relative to a longitudinal axis of said oil filter for filtering contaminated oil in an oil filtration unit, said oil filter being adapted to be arranged inside an inner opening of a housing of said oil filtration unit, where said oil filter comprises a filter inlet defined by an outer surface of the oil filter, an inner filter volume adapted to receive filtered oil, and a filter outlet providing gas and/or liquid communication between the inner filter volume and a housing outlet in order to release the filtered oil from the inner filter volume characterized in that,
    the top end surface of the oil filter comprises at least one aperture configured to provide continuous gas and/or liquid communication between the inner opening of the housing and the inner filter volume, wherein said at least one aperture extends in an axial direction relative to the longitudinal axis of the oil filter and has a cross-sectional area of 1-10 $mm^2$, and wherein filtering material of the oil filter is arranged between said at least one aperture and said inner filter volume, and
    said top end surface further comprises a tube, and where a first open end of said tube is connected to said at least one aperture, and a second open end of said tube extends away from said top end surface,
    where the second open end of said tube is located adjacent to an inner top surface of the housing, when the oil filter is arranged inside the inner opening of the housing.

7. The oil filtration unit according to claim 2, where the at least one aperture or the second open end of said tube is located 3 mm to 30 mm from the inner top surface of the housing, when the oil filter is arranged inside the inner opening of the housing.

8. The oil filtration unit according to claim 2, where a cross sectional area of the second open end of said tube ranges from 1 $mm^2$ to 10 $mm^2$.

9. The oil filtration unit according to claim 2, where the filtering material of the oil filter is also arranged between said inner filter volume and said filter outlet.

10. The oil filtration unit according to claim 3, where a cross sectional area of the second open end of said tube ranges from 1 $mm^2$ to 10 $mm^2$.

11. The oil filtration unit according to claim 3, where the filtering material of the oil filter is also arranged between said inner filter volume and said filter outlet.

12. The oil filtration unit according to claim 1, where a cross sectional area of the second open end of said tube ranges from 1 $mm^2$ to 10 $mm^2$.

13. The oil filtration unit according to claim 4, where the filtering material of the oil filter is also arranged between said inner filter volume and said filter outlet.

* * * * *